United States Patent
Paramonov et al.

(10) Patent No.: US 9,872,012 B2
(45) Date of Patent: Jan. 16, 2018

(54) METHOD AND APPARATUS FOR IMAGE CAPTURING AND SIMULTANEOUS DEPTH EXTRACTION

(71) Applicant: SAMSUNG ELECTRONICS CO., LTD., Suwon-si (KR)

(72) Inventors: Vladimir Petrovich Paramonov, Moscow (RU); Ivan Andreevich Panchenko, Leningradskaya oblast (RU); Victor Valentinovich Bucha, Moscow (RU)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 190 days.

(21) Appl. No.: 14/791,887

(22) Filed: Jul. 6, 2015

(65) Prior Publication Data

US 2016/0004925 A1   Jan. 7, 2016

(30) Foreign Application Priority Data

Jul. 4, 2014 (RU) ................................ 2014127469
Jun. 12, 2015 (KR) ........................ 10-2015-0083666

(51) Int. Cl.
*H04N 13/00* (2006.01)
*H04N 13/02* (2006.01)
(Continued)

(52) U.S. Cl.
CPC ......... *H04N 13/0271* (2013.01); *G01B 11/22* (2013.01); *G06T 3/4053* (2013.01);
(Continued)

(58) Field of Classification Search
CPC ....... G06T 2207/10028; G06T 2200/04; G06T 7/50; G06T 2207/20221; G06T 3/4053;
(Continued)

(56) References Cited

U.S. PATENT DOCUMENTS 5,019,852 A * 5/1991 Yamamoto ............. G03B 17/20
                                                                396/147
5,075,561 A * 12/1991 Rioux .................... G01B 11/24
                                                                250/201.8
(Continued)

FOREIGN PATENT DOCUMENTS

CN     101656835 A     2/2010
CN     102595171 A     7/2012
(Continued)

OTHER PUBLICATIONS

Anat Levin "Analyzing Depth from Coded Aperture Sets", 2010, 14 pgs. total.
(Continued)

*Primary Examiner* — Manav Seth
(74) *Attorney, Agent, or Firm* — Sughrue Mion, PLLC

(57) ABSTRACT

A system for image capturing and depth extraction includes a camera and a data processor. The camera includes: a spectrum coded aperture including at least two regions that pass spectrum channels of an incident light field which are different from each other; and a sensor configured to record the at least two spectrum channels to form an image captured in a sensor basis. The data processor is configured to convert the image captured in the sensor basis into an image of a processing basis, extract a disparity from the image of the processing basis, and convert the disparity into depth information.

33 Claims, 6 Drawing Sheets

(51) Int. Cl.
*G01B 11/22* (2006.01)
*G06T 3/40* (2006.01)
*G06T 7/50* (2017.01)
*H04N 5/33* (2006.01)

(52) U.S. Cl.
CPC .............. *G06T 7/50* (2017.01); *H04N 5/332* (2013.01); *H04N 13/0217* (2013.01); *H04N 13/0253* (2013.01); *G06T 2207/10028* (2013.01); *G06T 2207/20228* (2013.01); *H04N 2013/0081* (2013.01)

(58) Field of Classification Search
CPC .......... G06T 5/001; G06T 2207/20228; H04N 13/0253; H04N 2013/0081; H04N 13/0271; H04N 5/332; H04N 13/0217; H04N 5/2226; H04N 13/0018; H04N 13/0022; H04N 2213/003; G01B 11/22; G06F 3/0325

See application file for complete search history.

(56) References Cited

U.S. PATENT DOCUMENTS

| | | | | |
|---|---|---|---|---|
| 5,270,795 | A * | 12/1993 | Blais | G01C 11/00 356/152.2 |
| 5,548,418 | A * | 8/1996 | Gaynor | G02B 5/32 359/10 |
| 6,141,104 | A * | 10/2000 | Schulz | G01D 5/34 356/616 |
| 6,278,847 | B1 * | 8/2001 | Gharib | G01B 11/24 250/201.8 |
| 6,476,377 | B1 * | 11/2002 | Hodge | G01D 5/34 250/227.11 |
| 7,092,101 | B2 * | 8/2006 | Brady | G01J 3/02 356/419 |
| 7,212,663 | B2 * | 5/2007 | Tomasi | G01B 11/25 382/106 |
| 7,372,642 | B2 * | 5/2008 | Rohaly | H04N 13/0217 348/218.1 |
| 7,646,550 | B2 * | 1/2010 | Rohaly | G01B 11/24 348/218.1 |
| 7,746,568 | B2 * | 6/2010 | Rohaly | H04N 13/0217 359/618 |
| 8,073,268 | B2 * | 12/2011 | Haskell | G01T 1/295 356/310 |
| 8,395,696 | B2 | 3/2013 | Ng et al. | |
| 8,502,911 | B2 | 8/2013 | Yamamoto et al. | |
| 8,514,491 | B2 | 8/2013 | Duparre | |
| 8,538,144 | B2 * | 9/2013 | Benitez | G06T 15/20 382/154 |
| 8,619,082 | B1 * | 12/2013 | Ciurea | H04N 13/0022 345/427 |
| 9,030,529 | B2 * | 5/2015 | Chen | H04N 13/0011 348/47 |
| 9,042,709 | B2 * | 5/2015 | Morioka | H04N 13/025 348/42 |
| 9,060,113 | B2 * | 6/2015 | Rhoads | H04N 5/2256 |
| 9,222,767 | B2 * | 12/2015 | Suh | G01B 11/22 |
| 9,253,473 | B2 * | 2/2016 | Akeley | H04N 13/0406 |
| 9,392,262 | B2 * | 7/2016 | Dal Mutto | G06K 9/2036 |
| 2009/0284627 | A1 | 11/2009 | Bando et al. | |
| 2010/0066854 | A1 * | 3/2010 | Mather | G02B 5/005 348/222.1 |
| 2012/0093399 | A1 * | 4/2012 | Paik | H04N 5/23212 382/164 |
| 2012/0140094 | A1 * | 6/2012 | Shpunt | H04N 5/2254 348/239 |
| 2012/0242857 | A1 * | 9/2012 | Mather | G02B 5/005 348/222.1 |
| 2013/0033579 | A1 | 2/2013 | Wajs | |
| 2013/0107015 | A1 * | 5/2013 | Morioka | H04N 13/025 348/48 |
| 2013/0141541 | A1 | 6/2013 | Jung et al. | |
| 2013/0169643 | A1 * | 7/2013 | Suh | G01B 11/22 345/426 |
| 2014/0210964 | A1 | 7/2014 | Muijs et al. | |
| 2015/0009357 | A1 * | 1/2015 | Seibel | A61B 1/07 348/222.1 |
| 2015/0029312 | A1 * | 1/2015 | Paik | H04N 5/2254 348/46 |
| 2015/0281676 | A1 * | 10/2015 | Koehle | H04N 13/0253 348/49 |

FOREIGN PATENT DOCUMENTS

| | | |
|---|---|---|
| CN | 103210641 A | 7/2013 |
| CN | 103827920 A | 5/2014 |
| KR | 10-1290197 B1 | 7/2013 |
| KR | 10-1327228 B1 | 11/2013 |
| RU | 2436135 C2 | 12/2011 |
| RU | 2507503 C2 | 2/2014 |
| WO | 2010/121637 A1 | 10/2010 |
| WO | 2013/103408 A1 | 7/2013 |
| WO | 2013/103725 A1 | 7/2013 |
| WO | 2013/166215 A1 | 11/2013 |

OTHER PUBLICATIONS

Communication dated Dec. 3, 2015, issued by the Federal Service for Intellectual Property in counterpart Russian Patent Application No. 2014127469.

Communication dated May 17, 2016, issued by the Federal Service for Intellectual Property in counterpart Russian Patent Application No. 2014127469.

Communication dated Sep. 18, 2017 by the State Intellectual Property Office of China in counterpart Chinese Patent Application No. 201580034560.1.

* cited by examiner

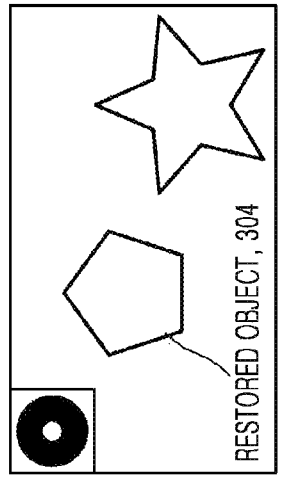
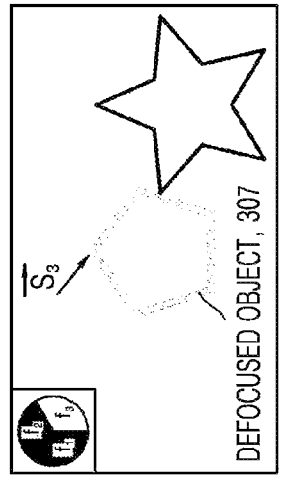
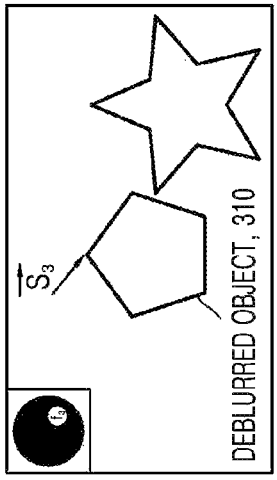
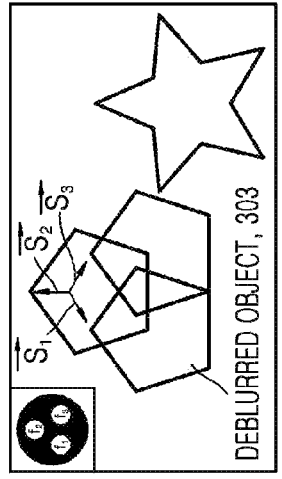
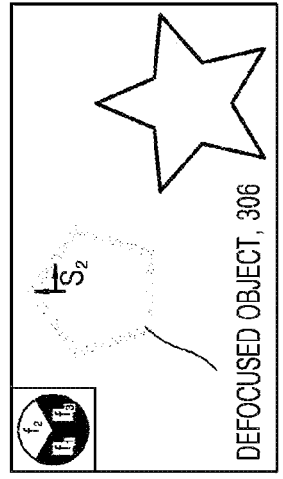
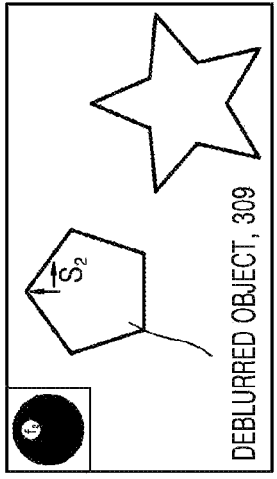
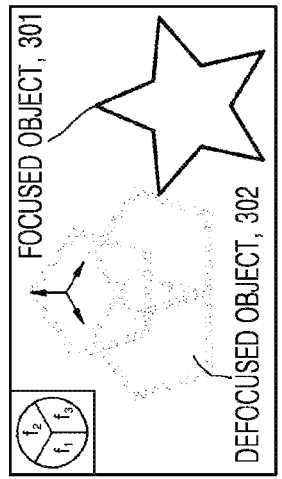
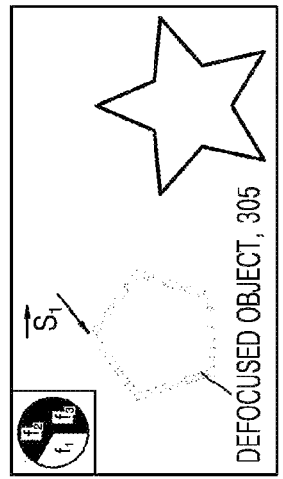
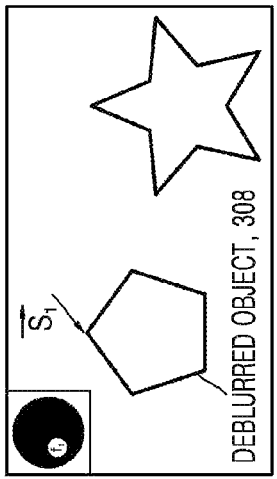

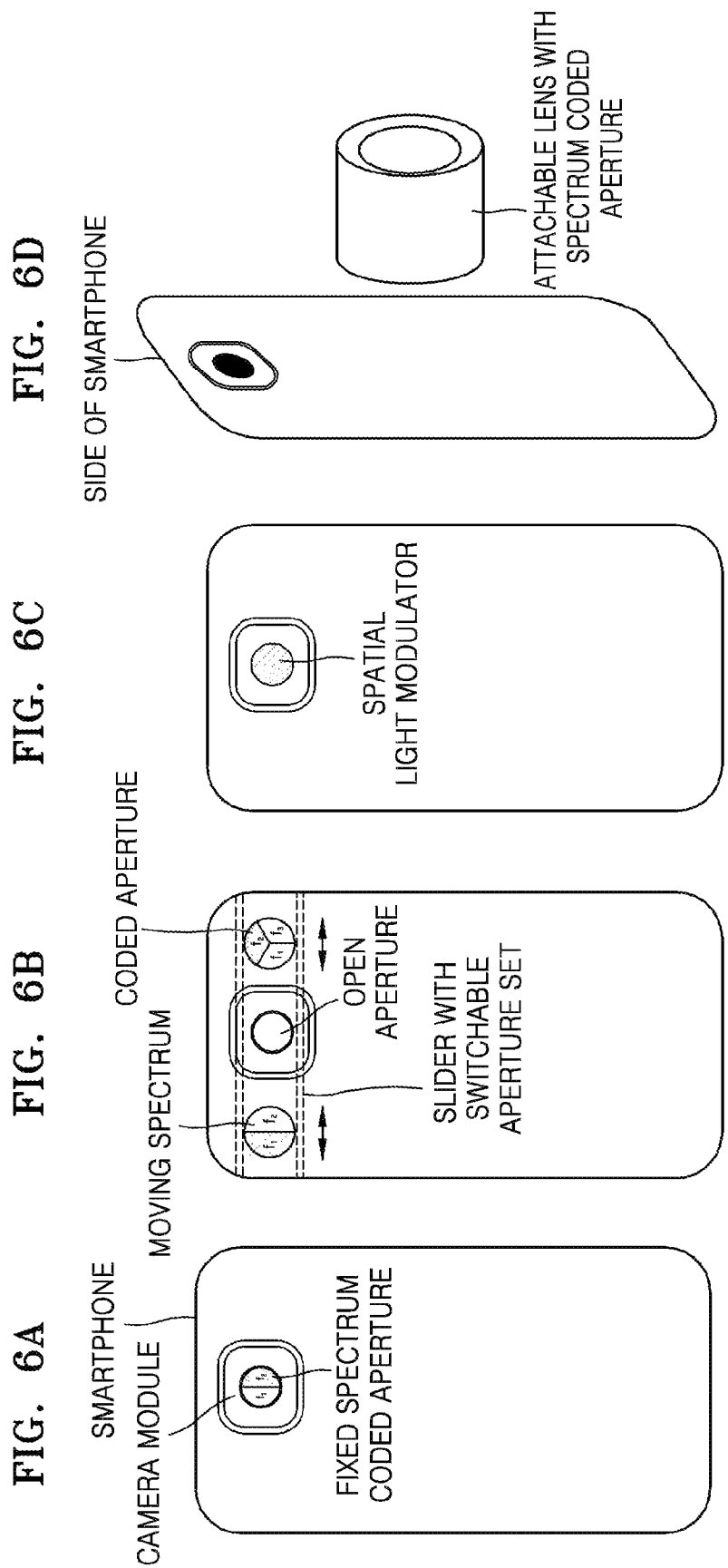

METHOD AND APPARATUS FOR IMAGE CAPTURING AND SIMULTANEOUS DEPTH EXTRACTION

CROSS-REFERENCE TO RELATED APPLICATIONS

This application claims priority from Russian Patent Application No. 2014127469, filed on Jul. 4, 2014 in the Russian Patent Office and Korean Patent Application No. 10-2015-0083666, filed on Jun. 12, 2015 in the Korean Intellectual Property Office, the disclosures of which are incorporated herein in their entirety by reference.

BACKGROUND

1. Field

Apparatuses and methods consistent with exemplary embodiments relate to computational photography, and more particularly, to light field capturing and processing.

2. Description of the Related Art

One of the main applications of light field photography is in extraction of image depth information. Examples of apparatuses for light field capturing or image depth information extraction may include a stereo camera, a plenoptic camera, a camera with a binary coded aperture, and a camera with a color coded aperture. However, these apparatuses may require additional space, increase costs of cameras, or cause a reduction in optical efficiency.

SUMMARY

Exemplary embodiments address at least the above problems and/or disadvantages and other disadvantages not described above. Also, the exemplary embodiments are not required to overcome the disadvantages described above, and may not overcome any of the problems described above.

One or more exemplary embodiments provide methods and apparatuses for light field capturing and processing by using information in an camera and a data processor.

According to an aspect of an exemplary embodiment, there is provided a system for image capturing and depth extraction including: a lens system; a spectrum coded aperture including at least two regions that pass spectrum channels of an incident light field which are different from each other; and a sensor configured to record the at least two spectrum channels to form an image captured in a sensor basis; and a data processor configured to convert the image captured in the sensor basis into an image of a processing basis, extract a disparity from the image of the processing basis, and convert the disparity into depth information.

The different spectrum channels may form a basis of the spectrum coded aperture.

The processing basis may be different from the sensor basis and the basis of the spectrum coded aperture.

The spectrum coded aperture may have three regions, and the three regions may include a transparent region in a central portion, and two regions having spectrum bandwidths respectively corresponding to yellow and cyan.

The processing basis may three vectors, and the three vectors may include a vector corresponding to yellow, a vector corresponding to cyan, and a vector perpendicular to the two vector.

The spectrum coded aperture may include two regions having spectrum bandwidths respectively corresponding to yellow and cyan.

The processing basis may include three vectors, and the three vectors may include a vector respectively corresponding to yellow, a vector corresponding to cyan, and a vector perpendicular to the two vector.

The spectrum coded aperture may include three congruent regions having spectrum bandwidths respectively corresponding to yellow, cyan, and magenta.

The processing basis may include vectors corresponding to yellow, cyan, and magenta.

The spectrum coded aperture may include three non-congruent regions having spectrum bandwidths respectively corresponding to yellow, cyan, and magenta.

The processing basis may include vectors respectively corresponding to yellow, cyan, and magenta.

The spectrum coded aperture may have a smooth bandwidth change over an aperture region.

The spectrum coded aperture may be fixed to the lens system.

The spectrum coded aperture may be attachable to and detachable from the lens system.

The spectrum coded aperture may be moved from an optical train that does not participate in the image formation.

The captured image may be an image selected from a video sequence.

The spectrum coded aperture may insert the image selected from the video sequence into the lens system.

The spectrum coded aperture may be inserted into an aperture stop of the lens system.

The lens system may include a single lens and the spectrum coded aperture may be located in the lens.

The spectrum coded aperture may correct a previous video image of the video sequence acquired by the sensor.

The spectrum coded aperture may have a combination of an opaque region and a congruent region, and the congruent region may be transparent or transmit ultraviolet light, infrared light, or visible light.

The spectrum coded aperture may have a combination of an opaque region and a non-congruent region, and the non-congruent region may be transparent or transmits ultraviolet light, infrared light, or visible light.

The spectrum coded aperture may be a spatial light modulator (SLM).

The data processor may include a preprocessing unit configured to perform the converting the captured image, a disparity estimation unit configured to perform the extracting the disparity, and a conversion unit configured to perform the converting the disparity to the depth information.

The data processor may further include an image restoration unit configured to restore the captured image based on the extracted disparity.

According to another aspect of an exemplary embodiment, there is provided a method of image capturing and depth extraction including: recording at least two shifted spectrum channels of a light field to form an image captured from a video; converting the captured image into an image of a processing basis; estimating a disparity based on a correlation between pixels of the spectrum channels in the processing basis to extract a disparity map; restoring the captured image based on the extracted disparity map; and converting the disparity map into a depth map.

The estimating of the disparity may include: generating candidate images having respective shifts in the spectrum channels; computing matching cost involved in the candidate images in the spectrum channels; propagating a matching cost involved in a low textured region of the candidate images; and estimating a matching cost having a sub-pixel accuracy based on the propagated matching cost.

The correlation between the pixels of the spectrum channel for requesting the disparity estimation may include a correlation metric computed in a sparse moving window.

The correlation between the pixels of the spectrum channel for requesting the disparity estimation may be computed by using at least one stereo matching algorithm.

The computing of the correlation by using the stereo matching algorithm may include sum of absolute differences (SAD), normalized cross correlation (NCC), or Laplacian image contrast (LIC).

The correlation metric may include a fast Fourier transform (FFT).

The correlation metric may include a recursive exponential filter (REF).

The restoring of the captured image may include performing image blurring.

The restoring of the captured image may include performing a spectrum channel alignment in the processing basis.

According to another aspect of an exemplary embodiment, there is provided a mobile device for image capturing and depth extraction in ultraviolet light, infrared light, or visible light including: a lens system; at least one spectrum coded aperture including at least two regions that pass spectrum channels of an incident light field which are different from each other; a sensor configured to record the at least two spectrum channels to form an image captured in a sensor basis; and a coded aperture fixture configured to move at least one spectrum coded aperture relatively with respect to the lens system; and a data processor configured to convert the image captured in the sensor basis into an image of a processing basis, extract a disparity from the image of the processing basis, and convert the disparity into depth information.

The coded aperture fixture may be configured to replace at least two spectrum coded apertures in an optical train.

The coded aperture fixture may be configured to shift all the spectrum coded apertures from the optical train.

The coded aperture fixture may be inserted into an aperture stop.

The spectrum coded aperture may have a combination of an opaque region and a congruent region, and the congruent region may be transparent or transmit ultraviolet light, infrared light, or visible light.

The spectrum coded aperture may have a combination of an opaque region and a non-congruent region, and the non-congruent region may be transparent or transmits ultraviolet light, infrared light, or visible light.

According to another aspect of an exemplary embodiment, there is provided an apparatus for image capturing including: a lens system; at least two spectrum coded apertures including a first aperture and a second aperture which have different characteristics of optical efficiency and depth discrimination from each other; a coded aperture fixture adapted to dispose the first aperture in front of the lens system; and a data processor configured to obtain depth information of an image captured through the first spectrum coded aperture, and control the coded aperture fixture to determine whether to switch the first aperture to the second aperture based on the depth information.

The first aperture may include a transparent region placed in the center of the first aperture and two regions separated by the transparent region. The two regions pass different color spectrums, respectively.

The two regions may pass a yellow spectrum and a cyan spectrum, respectively.

The second aperture may include equally divided two regions which may pass yellow and cyan spectrums, respectively.

BRIEF DESCRIPTION OF THE DRAWINGS

The above and/or other aspects will be more apparent by describing certain exemplary embodiments, with reference to the accompanying drawings, in which:

FIGS. 3A to 3I are diagrams for describing a channel shift;

FIGS. 6A to 6D are diagrams for describing a depth extraction/image restoration apparatus according to an exemplary embodiment.

DETAILED DESCRIPTION

Figure 1:
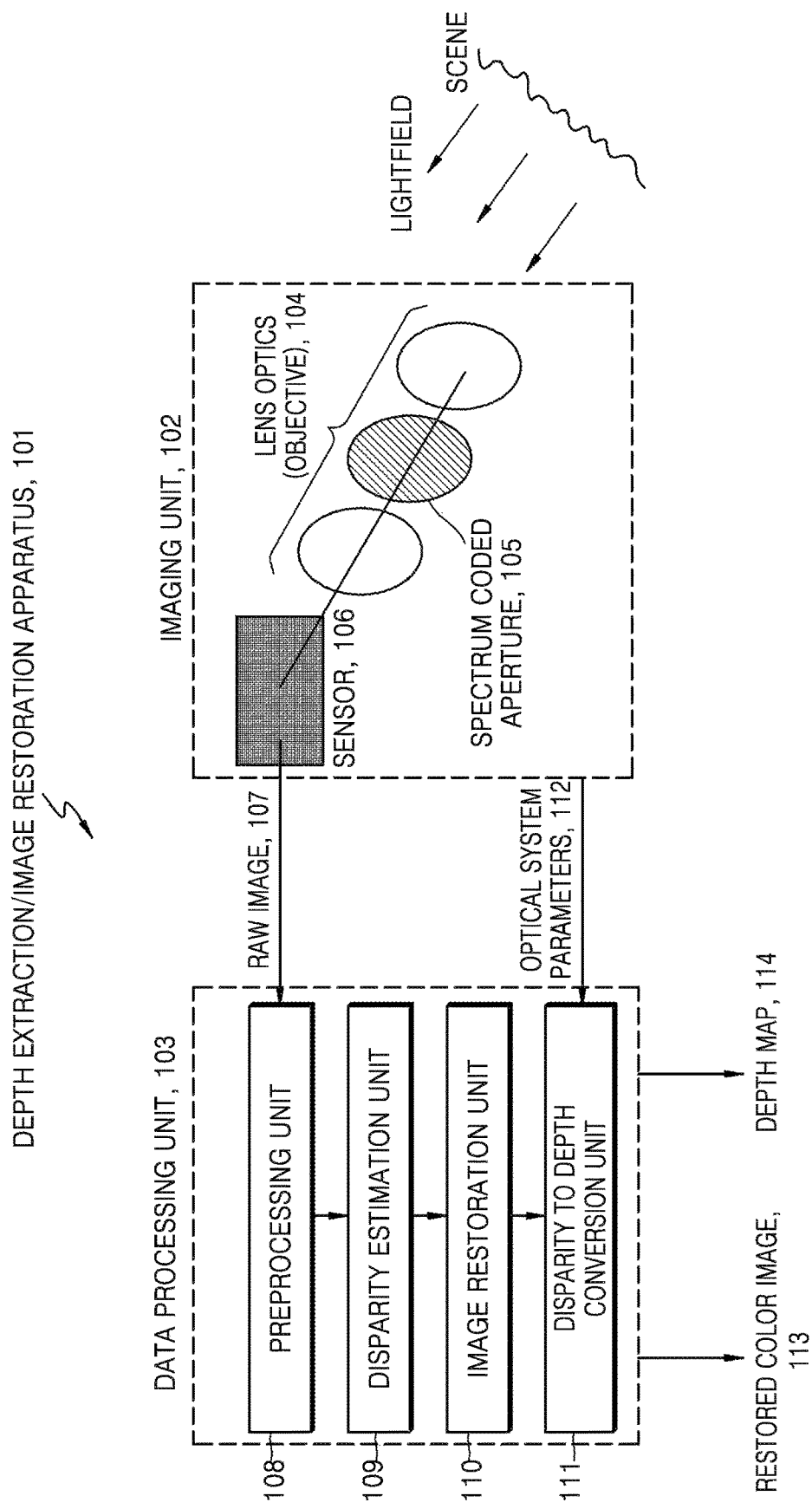
FIG. 1 is a diagram of a depth extraction/image restoration apparatus according to an exemplary embodiment.

Exemplary embodiments are described in greater detail below with reference to the accompanying drawings.

In the following description, like drawing reference numerals are used for like elements, even in different drawings. The matters defined in the description, such as detailed construction and elements, are provided to assist in a comprehensive understanding of the exemplary embodiments. However, it is apparent that the exemplary embodiments can be practiced without those specifically defined matters. Also, well-known functions or constructions are not described in detail since they would obscure the description with unnecessary detail.

As used herein, the term "and/or" includes any and all combinations of one or more of the associated listed items.

It will be understood that when a region is referred to as being "connected to" or "coupled to" another region, it may be directly connected or coupled to the other region or intervening regions may be present. It will be understood that terms such as "comprise", "include", and "have", when used herein, specify the presence of stated elements, but do not preclude the presence or addition of one or more other elements.

FIG. 1 is a diagram of a depth extraction/image restoration apparatus 101 according to an exemplary embodiment. The depth extraction/image restoration apparatus 101 may include a camera 102 and a data processor 103. The camera 102 may include optical lens (objective lens) 104, a spectrum coded aperture 105, and a sensor 106. The spectrum coded aperture 105 may be inserted into an optical system which is constituted by the combination of the lens 104, the sensor 106, and other optical parts. The spectrum coded aperture 105 may be placed in an optical path that a ray of light follows through the optical system. The spectrum coded aperture 105 may be a diaphragm plane. The sensor 106 may be configured to discriminate different spectrum bandwidths from one another. For example, the sensor 106 may be a sensor covered with a mosaic color/spectrum filter array, or a color stacked photodiode sensor. The data processor 103 may include a preprocessing unit 108, a disparity estimation unit 109, an image restoration unit 110, and a disparity-to-depth conversion unit 111. The data processor 103 may receive a raw image 107 captured by the camera 102. The preprocessing unit 108 may convert the captured image 107 from a sensor basis to a processing basis in which a spectrum coded aperture filter may not be present. The disparity estimation unit 109 may perform disparity estimation. Then image restoration unit 110 may perform image restoration. The disparity-to-depth conversion unit 111 may perform disparity-to-depth conversion on optical system parameters.

The spectrum coded aperture 105 may be divided into sub-regions that respectively have spectrum passbands. The number, geometric structures, and spectrum passbands of the sub-regions may be changed according to applications of optical efficiency, a depth map, and color image restoration image quality. Some of them are illustrated in FIGS. 2A to 2F.

Figure 2A:
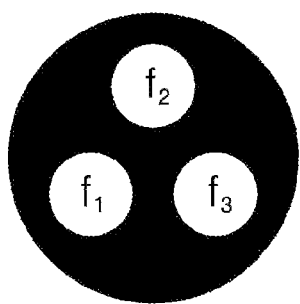
FIGS. 2A to 2F are diagrams of spectrum coded apertures according to exemplary embodiments.
Figure 2B:
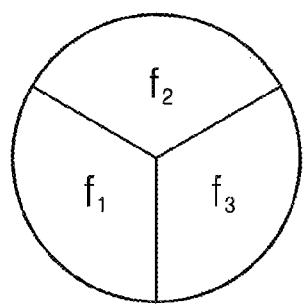

FIGS. 2A to 2F are diagrams illustrating patterns of various spectrum coded apertures having a tradeoff relationship among the optical efficiency, the depth map, and the color image restoration image quality. For light field coding, spectrum filters $f_1$, $f_2$, and $f_3$ may be used. Examples of the spectrum filters $f_1$, $f_2$, and $f_3$ may include a visibly recognizable color filter, an infrared/ultraviolet filter, and a multipath filter having two or more passbands Main characteristics of a spectrum coded aperture are optical efficiency, depth discrimination ability, and color image restoration image quality. The highest depth discrimination index may be obtained from a geometric structure of a spectrum coded aperture having the longest distance between the centers of aperture sub-regions corresponding to respective optical spectrum bands. FIG. 2A shows an aperture pattern that has a relatively long distance between the centers of sub-regions $f_1$, $f_2$, and $f_3$ and a relatively small filter size in the sub-regions. Consequently, an opaque region of the coded aperture may be increased so that the optical system has a reduced optical efficiency. If the aperture design is deformed to enhance optical efficiency as shown in FIG. 2B, the typically extracted disparity accuracy may be deteriorated.

Figure 2C:
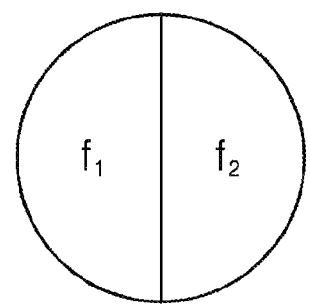
Figure 2D:
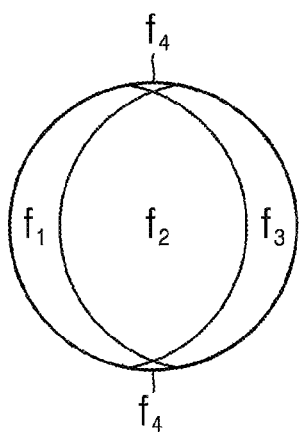
Figure 2E:
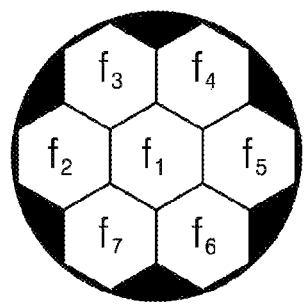
Figure 2F:
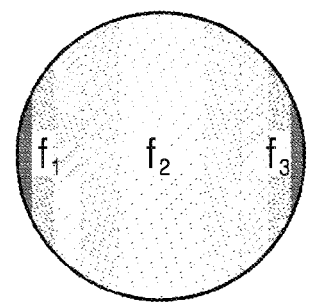

For specific applications, there may exist a tradeoff between optical efficiency and depth discrimination ability. For example, FIG. 2C shows a geometric structure of an aperture having a cyan filter $f_1$ (i.e. $f_1=f_{Cyan}$) and a yellow filter $f_2$ (i.e., $f_2=f_{Yellow}$) on halves and FIG. 2D shows a geometric structure of an aperture having a transparent sub-region $f_2$ a cyan filter $f_1$ (i.e., $f_1=f_{Cyan}$), a yellow filter $f_3$ $f_1$ (i.e., $f_3=f_{Yellow}$), and a green filter $f_4$ (i.e., $f_4=f_{Green}$). Here, the yellow filter may have a passband including green and red light spectrums. The cyan filter may have a passband including green and blue light spectrums. The transparent region may not filter incoming light. The green channel may not be distorted by these filters and may be used as a reference in an image restoration process. In comparison with the aperture structure of FIG. 2D, the aperture structure in FIG. 2C may have a better depth map. However, the aperture structure of FIG. 2D may have an superior optical efficiency to the aperture structure of FIG. 2C. FIG. 2A shows an aperture having a circular filter and an opaque region, which may be used to obtain a high-quality depth map image when light is excessive. The aperture structure of FIG. 2A may compensate for excessive light directed to the camera 102. An aperture structure having infrared light and ultraviolet light on halves as shown in FIG. 2C may be a fully opened aperture and may have the same optical efficiency and have excellent potential with respect to depth extraction. However, an additional process such as image restoration and photograph array correction may be performed for an image captured through the aperture structure of FIG. 2. FIG. 2E shows a spectrum coded aperture having three or more spectrum sub-regions with a hive arrangement and FIG. 2F illustrates a spectrum coded aperture having a smooth bandwidth change over an aperture region.

The light field, which is corrected by the spectrum coded aperture 105, may be input to the image sensor 106 that generates the captured raw image 107.

The light field having passed through the spectrum coded aperture 105 may be coded. That is, the light field may be divided into different spectrum parts by passing through corresponding aperture sub-regions. Therefore, different views may be extracted from a single captured image with respect to the same scene by dividing the single captured image into spectrum channels correspondingly with respect to the spectrum coded aperture.

FIG. 3A illustrates the captured image 107 obtained by a sensor 106 that is capable of discriminating the corresponding spectrum bandwidth with respect to the spectrum coded aperture described above with reference to FIG. 2B. In the optical system, a position of a defocused object 302 in FIG. 3A), which is obtained by the presence of the spectrum coded aperture, may be changed with respect to relatively corresponding spectrum filter positions as shown in FIGS. 3D, 3E, and 3F as compared to a focused object 301 in FIG. 3A). Such a view may be used for extracting a disparity map and restoring the captured image 107. The results of image deblurring with respect to the spectrum channels are illustrated in FIGS. 3G, 3H, and 3I. A deblurred color image is illustrated in FIG. 3B. A deblurred image (restored image) aligned in the spectrum channel is illustrated in FIG. 3C.

Figure 4:
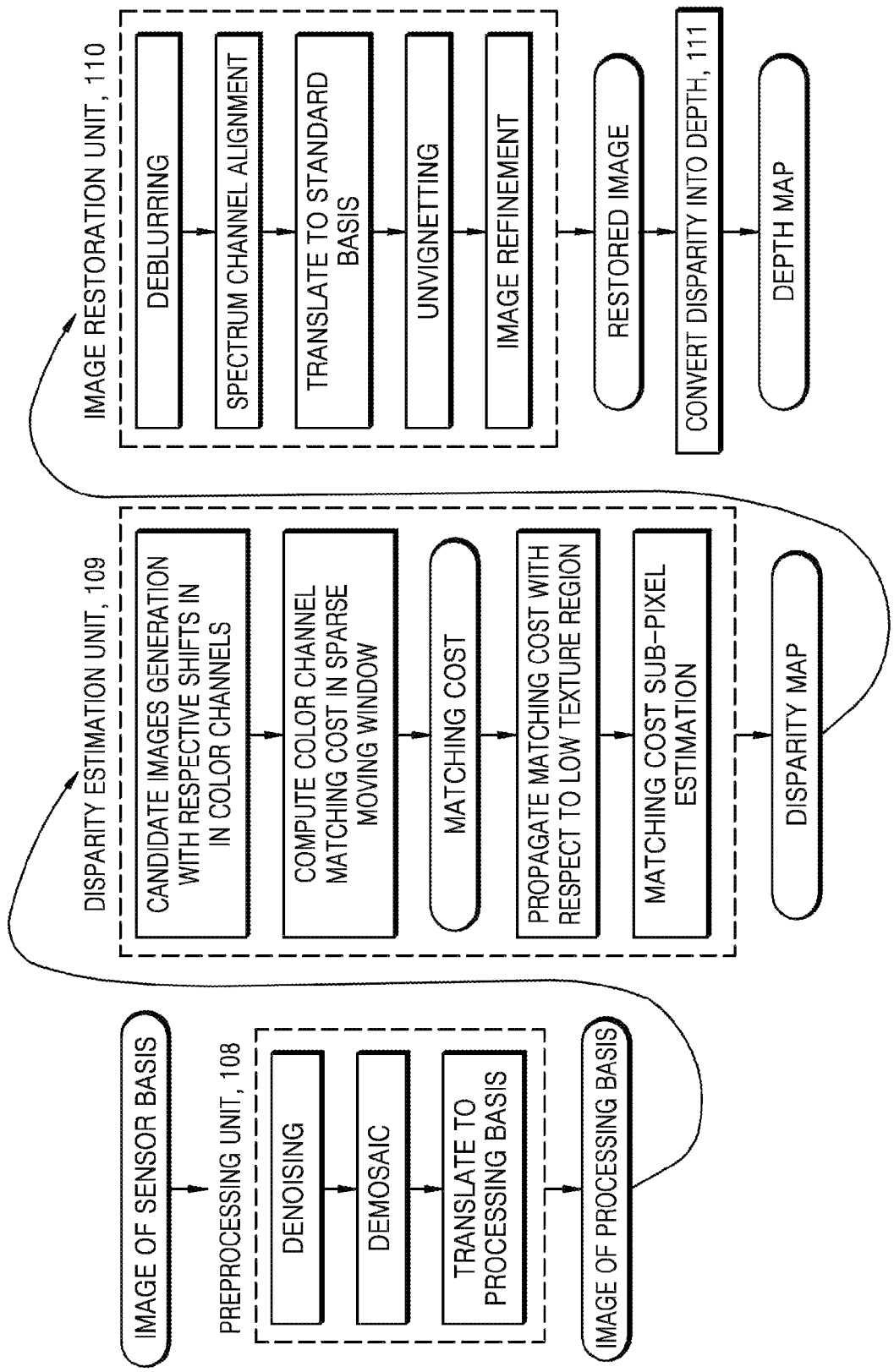
FIG. 4 is a high-level outline diagram of a depth information extraction/image restoration method according to an exemplary embodiment.

FIG. 4 is a high-level outline diagram of the data processor 103. A system input may be the raw image 107 captured by the camera 102. In operation 108, the captured image $\{Is_1, Is_2, \ldots\}$ 107 may be preprocessed by denoising and demosaic technologies and be translated from a sensor spectrum basis to a processing basis. In general, the processing basis may not be a spectrum filter. $Is_i$ is an image color channel acquired by an optical system sensor. In order to perform such a conversion, a conversion matrix $\Pi$ needs to be preferentially estimated. For simplicity, it is assumed that the camera 102 uses the aperture structure having a cyan filter $f_1$ and a yellow $f_2$ as described above with reference to FIG. 2C, and a red, green, blue (RGB) mosaic color filter array.

$w_{Cyan}$ and $w_{Yellow}$ are color filters that represent cyan and yellow filters in an RGB color space. In order to construct a conversion matrix that has an excellent condition number and is capable of a non-degenerate inverse conversion, a third basis vector $w_X$ is defined as a vector product $w_{Cyan} \times w_{Yellow}$. Vectors $e_r$, $e_g$, and $e_b$ are respectively a red basis, a green basis, and a blue basis for the camera sensor 106. In the sensor spectrum basis, $$w_{fi}=(p_{1i}e_r, p_{2i}e_g, p_{3i}e_b)^T, i=1,2,3$$

An auxiliary matrix $\Pi$ is represented as follows:

$$\Pi = (w_{Cyan}, w_X, w_{Yellow}) = \begin{bmatrix} p_{11} & p_{12} & p_{13} \\ p_{21} & p_{22} & p_{23} \\ p_{31} & p_{32} & p_{33} \end{bmatrix}.$$

If the matrix $\Pi$ is used, any observed color $w$ may be decomposed by an aperture filter response.

$$w_{filter}=\Pi^{-1}w,$$

$w_{filter}$ means a channel intensity in the spectrum filter basis (cyan, X, and yellow). The matrix Π may be inversely converted. $\{If_{Cyan}, If_X, If_{Yellow}\}$ represents an image channel acquired in the processing basis. In the case of a different number of basis vectors in the sensor basis and the processing basis, an inverse conversion matrix (a left inverse matrix and a right inverse matrix) may be used.

In operation 109, a disparity disp(i,j) may be estimated with respect to all pixels of the image. disp(i,j) is a matching cost for disparity estimation and may use a conventional cross-correlation method of a shifted spectrum channel corr($If_{Cyan}^d, If_{Yellow}^d$).

$$disp(i,j) = \operatorname{argmax}_d [corr(If_{Cyan}^d(i,j), If_{Yellow}^d(i,j))]^2$$

A generalized mutual correlation metric may be used in the disparity estimation unit 109 so as to process an arbitrary number of spectrum channels. $\{I_i\}_1^n$ represents a set of nth acquired views in the nth acquired spectrum channel with respect to the same scene from slightly different viewpoints. $I_i$ represents an M×N frame. A conventional correlation matrix $M_d$ may be expressed by the set $\{I_i\}_1^n$ and a disparity value d.

$$M_d = \begin{pmatrix} 1 & \cdots & corr(I_1^d, I_n^d) \\ \vdots & \ddots & \vdots \\ corr(I_n^d, I_1^d) & \cdots & 1 \end{pmatrix}$$

where $(*)^d$ means a parallel shift in a corresponding channel.

A determinant of the matrix $M_d$ is a good measure of the mutual correlation $\{I_i\}_1^n$. In practice, in a case where all channels are completely correlated, the matrix $M_d$ is a singular matrix and the determinant thereof is 0. In another aspect, in a case where data is completely uncorrelated, the determinant of the matrix $M_d$ is 1. In order to estimate the depth map by using such an operator, the disparity value d corresponding to the least value of the determinant $det(M_d)$ needs to be found from each pixel of the image.

Other operators for cost computation matching may be used. Examples of the operators may include conventional stereo matching metrics, Laplacian contrast metrics, and feature based metrics.

All statistic computations may use a conventional local moving window. However, in an exemplary embodiment, an exponential moving window may be used because this complies with a naturally sparse gradient prior and propagates a matching cost with respect to a low textured region. Furthermore, an exponential kernel filtering may be efficiently computed by using a recursive 0(1) convolution in a spectrum domain.

$$S_n = I_n \cdot (1-\alpha) + S_{n-1} \cdot \alpha,$$

where S is a result of convolution with respect to an image I at an nth pixel, and a is defined as follows:

$$\alpha = e^{-\sigma_{spatial}}$$

where $\sigma_{spatial}$ is an exponential dampling factor that represents an image similarity required in a spatial domain.

This equation may also be used for computing an effective approximate value of a joint bilateral filter for propagating disparity information on a small texture region.

$$S_n = Disp_n \cdot (1-\alpha(n)) + S_{n-1} \cdot \alpha(n),$$

where $Disp_n$ is a disparity of an nth pixel, and $\alpha(n)$ is a function representing the degree of similarity of an image color.

$$\alpha(n) = e^{-\sigma_{spatial}} \cdot e^{-\sigma_{range} \cdot \Delta(I_n, I_{n-1})},$$

where $\Delta(I_n, I_{n-1})$ represents the degree of similarity between color images in a range domain.

Figure 5:
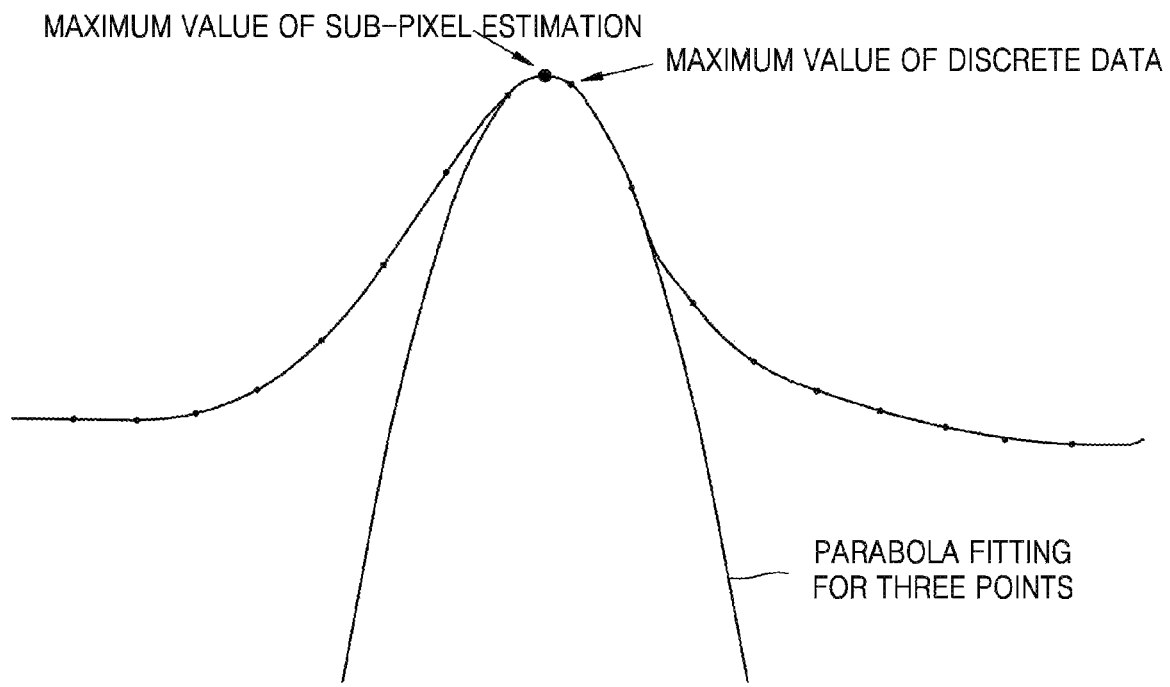
FIG. 5 is a diagram for describing a parabola fitting according to an exemplary embodiment.

Sub-pixel estimation may be performed by using a parabola fitting algorithm as shown in FIG. 5. In parabola fitting, three given points, $d_k$, $d_{k-1}$, $d_{k+1}$ may be taken into consideration. $d_k$ may be represented as $\operatorname{argmax}_d det(M_d)$ (i.e., $d_k = \operatorname{argmax}_d det(M_d)$), and $d_{k-1}$ and $d_{k+1}$ may be set as a previous argument and a next argument, respectively. A variable of a maximum value of a unique parabola satisfying $\{d_{k-1}, det(M_{d_{k-1}})\}$, $\{d_k, det(M_{d_k})\}$, and $\{d_k, det(M_{d_k})\}$ may be analytically computed in the following formula.

$$d_{max}^{sub-pixel} = d_k - \frac{b}{2a}$$

where $a = 0.5(d_{k+1} + d_{k-1}) - d_k$ and $b = 0.5(d_{k+1} - d_{k-1})$

The image restoration unit 110 may perform preliminary image restoration Ir(x,y) based on the disparity estimation. The captured image of FIG. 3A may be deblurred as shown in FIG. 3B. A color alignment of the deblurred image may be performed as shown in FIG. 3C. FIG. 3A illustrates an example of the image captured by the system. FIG. 2B illustrates a geometric structure of a spectrum coded aperture. The system may be focused on one object 301 and another object 302 may be defocused. The defocused object 302 captured by the camera 102 may cause a spectrum channel misalignment in a photo array to the extent that the blurred images 305, 306, and 307 as shown in FIG. 3D, FIG. 3E, and FIG. 3F are blurred with respect to a conventional imaging system. The image deblurring may be performed based on a deconvolution technology and be applied to images corresponding to different disparity values. For example, while the focused object 301 does not require the deblurring, the images 305, 306, and 307 of the defocused object 302 in the respective spectrum channels are deblurred with respect to the disparity levels thereof. The deblurred image of FIG. 3B is still misaligned with respect to the spectrum channels $f_1$, $f_2$, and $f_3$, as shown in FIGS. 3G, 3H, and 3I. Misalignment vectors $\vec{s}_1$, $\vec{s}_2$, and $\vec{s}_3$ respectively corresponding to the spectrum channels $f_1$, $f_2$, and $f_3$ may be estimated at the respective positions of the captured image 302. A restored image $\widetilde{If}$ 304 may be acquired by the aligned spectrum channel, based on the misalignment vectors $\vec{s}_1$, $\vec{s}_2$, and $\vec{s}_3$.

$$\widetilde{If}_i(x,y) = If_i(x+s_{ix}, y+s_{iy}),$$

where i is the number of spectrum channels, and $s_{ix}$ and $s_{iy}$ are projections in an x-axis direction and a y-axis direction of a vector $\vec{s}_i$, respectively.

The image may be converted from a spectrum filter basis $\{If_1, If_2, \ldots\}$ to a device play unit basis $\{I_1, I_2, \ldots\}$. The imaging system has a vignetting effect that results in a reduction of an image's brightness at the periphery of the image, as compared to the center of image. In such a system, the vignetting effect may be mathematically alleviated by the following equation.

$$I_{i,j}^{restored} = U_{i,j} \cdot I_{i,j},$$

where $I_{i,j}$ and $I_{i,j}^{restored}$ are a captured image and a restored image at an (i,j) pixel, respectively. $U_{i,j}$ is an unvignetting coefficient previously computed once during the calibration of the optical system.

$$U_{i,j} = \frac{I_{i,j}^{ideal}}{I_{i,j}},$$

where $I_{i,j}$ and $I_{i,j}^{ideal}$ are a captured image and an unvignetted image of a known image at an (i,j) pixel, respectively.

In a case where the coded aperture is present, the unvignetting coefficient $U_{i,j}$ needs to be independently computed with respect to each spectrum channel. This process may be performed by the image restoration unit 110.

A final image refinement process may be used to reduce artifact caused by inaccurate disparity estimation. Technologies based on a human's visual perception (for example, bilateral filtering, median filtering, or the like) and natural image priors (for example, sparse gradient prior, color lines prior, or the like) may be used.

The placement-to-depth conversion unit 111 may convert the disparity disp(i,j) into a depth map d(i,j) 114 with respect to a single lens optical system by using generalized optical system parameters 112 generalized in a thin lens formula.

$$\frac{1}{z_1} + \frac{1 + d/D}{z_2} = \frac{1}{f},$$

where f is a lens center distance, and $z_1$ and $z_2$ are distances from each lens to an object plane and an image plane, respectively.

This formula for a complex object may depend on the design of the optical system.

The above-described image capturing apparatus may be extended for performing a temporal coding and a spectral coding. The temporal coding may be performed while moving the spectrum coded aperture with respect to the image capturing apparatus. This extension may remove a motion blur as well as a known defocus blur caused by a movement of the spectrum coded aperture.

The above-described image capturing apparatus may extract depth information from a photograph as well as a video stream that is appropriately encrypted by the coded aperture and is appropriately registered by a detector array. In addition, the spectrum coded aperture may be modified so as to mix a photograph and depth information on the image captured according to the presence or absence of the spectrum coded aperture. For example, the depth map extraction process may be performed by just using a key frame (for example, every Nth frames) of a video sequence, and other frames may be restored by using image information and a depth map of the key frame. This process may increase time efficiency and image quality of the system.

Furthermore, the type of the spectrum coded aperture and the geometric structure may be changed according to the image automatically captured by the detector array. For example, when light is excessive, the aperture including the circular filter and the opaque region, as illustrated in FIG. 2A, may be used instead of reducing the exposure time or increasing the f-number of the optical system.

The depth extraction/image restoration apparatus according to the exemplary embodiment may be included in mobile phone camera or web camera equipment, but is not limited thereto. The depth extraction/image restoration apparatus according to the exemplary embodiment may be used in a compact optical camera.

FIG. 6A is a diagram of a permanently fixed color coded aperture in an optical system of a camera, according to an exemplary embodiment. Since light passes through a fixed color filter aperture, the image quality of a color image may degrade. Each color band may be projected at different positions of a photograph array causing a ghost image effect. A depth estimation and a color image restoration may be performed by the above-described depth estimation method.

FIG. 6B is a diagram of a color coded aperture in which an optical system is movable by a mechanical or electromagnetic unit, according to an exemplary embodiment. In a three-dimensional (3D) mode, the color coded aperture may be present in an optical system to acquire depth information on a scene and a computatively restored color image. In a two-dimensional (2D) mode, the color coded aperture may not be present in an optical system that captures an original 2D image without distortion.

As shown in FIG. 6B, at least two spectrum coded apertures may be attached to the smartphone. The slider (also referred to as an aperture fixture) may switch between the spectrum coded apertures, for example, according to a control signal from the data processor 103. However, the present embodiment is not limited thereto, and the spectrum coded apertures may be switched manually or under the control of a central processing unit (CPU) in the smartphone. When an image is captured through one of the spectrum coded apertures, the data processor 103 may extract depth information from the captured image and determine whether to change the aperture to another one based on the depth information. For example, if the data processor 103 determines that the depth discrimination of the image does not meet a requirement preset by a user input, the data processor 103 may send a control signal to the slider so that the previously used aperture is changed to another one which is known to have a better depth discrimination ability.

FIG. 6C is a diagram of a spectrum coded aperture with a spatial light modulator (SLM) capable of changing a spectrum passband of a coded color aperture, based on time, according to an exemplary embodiment. The apparatus of FIG. 6C may operate in a 2D or 3D mode as described above with reference to the exemplary embodiment of FIG. 6B.

In addition, the apparatuses of FIGS. 6B and 6C may also acquire alternating video frames. By changing the aperture before the frame is recorded, one frame may be obtained in the 2D mode and another frame may be obtained in the 3D mode. Consequently, the system may acquire two video streams. One video frame may include an original color frame acquired in the 2D mode, and another video stream may include a frame suitable for the depth extraction.

FIG. 6D is a diagram of a spectrum coded aperture that is attachable to a smartphone lens, according to an exemplary embodiment. Due to a larger size of an optical system, the apparatus of FIG. 6D may obtain more excellent depth map image quality as well as more excellent optical efficiency and video image quality than apparatuses with the attached spectrum coded aperture.

The apparatus according to the exemplary embodiment includes a spectrum filtered aperture, and at least one of a RGB color filter, a red, green, blue, and white (RGBW) color filter, a cyan, magenta, yellow (CMY) filter, a cyan, magenta, yellow, green (CMYG) color filter, and an infrared (IR) filter, but is not limited thereto. A combination of sensors having color/spectrum spaces may be used.

The exemplary embodiment may be applied to any digital cameras, including a mobile phone camera, so as to perform mirror hardware modification and generate the disparity/depth maps having low cost algorithms. The acquired disparity map may be used in image splitting, custom blur type (bokeh), computational viewpoint disparity, image filtering, and digital post-refocusing having other special effects.

In addition, the term "unit" as used herein may mean a hardware component, such as a processor or a circuit, and/or a software component that is executed by a hardware component such as a processor.

While not restricted thereto, an exemplary embodiment can be embodied as computer-readable code on a computer-readable recording medium. The computer-readable recording medium is any data storage device that can store data that can be thereafter read by a computer system. Examples of the computer-readable recording medium include read-only memory (ROM), random-access memory (RAM), CD-ROMs, magnetic tapes, floppy disks, and optical data storage devices. The computer-readable recording medium can also be distributed over network-coupled computer systems so that the computer-readable code is stored and executed in a distributed fashion. Also, an exemplary embodiment may be written as a computer program transmitted over a computer-readable transmission medium, such as a carrier wave, and received and implemented in general-use or special-purpose digital computers that execute the programs. Moreover, it is understood that in exemplary embodiments, one or more units of the above-described apparatuses and devices can include circuitry, a processor, a microprocessor, etc., and may execute a computer program stored in a computer-readable medium.

The foregoing exemplary embodiments are merely exemplary and are not to be construed as limiting. The present teaching can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. A system for image capturing and depth extraction, the system comprising:
    a lens system;
    a spectrum coded aperture including at least two regions that pass spectrum channels of an incident light field which are different from each other; and
    a sensor configured to record the at least two spectrum channels to form an image captured in a sensor basis; and
    a data processor configured to convert the image captured in the sensor basis into an image of a processing basis, extract a disparity from the image of the processing basis, and convert the disparity into depth information.

2. The system of claim 1, wherein the different spectrum channels form a basis of the spectrum coded aperture.

3. The system of claim 2, wherein the processing basis is different from the sensor basis and the basis of the spectrum coded aperture.

4. The system of claim 1, wherein the spectrum coded aperture has three regions including a transparent region in a central portion, and two regions having spectrum bandwidths respectively corresponding to yellow and cyan.

5. The system of claim 1, wherein the at least two regions of the spectrum coded aperture have spectrum bandwidths respectively corresponding to yellow and cyan.

6. The system of claim 1, wherein the spectrum coded aperture includes three congruent regions having spectrum bandwidths respectively corresponding to yellow, cyan, and magenta.

7. The system of claim 1, wherein the spectrum coded aperture includes three non-congruent regions having spectrum bandwidths respectively corresponding to yellow, cyan, and magenta.

8. The system of claim 1, wherein the spectrum coded aperture has a smooth bandwidth change over an aperture region.

9. The system of claim 1, wherein the spectrum coded aperture is fixed to the lens system.

10. The system of claim 1, wherein the spectrum coded aperture is attachable to and detachable from the lens system.

11. The system of claim 1, wherein the spectrum coded aperture has a combination of an opaque region and a congruent region, and
    the congruent region is transparent or transmits ultraviolet light, infrared light, or visible light.

12. The system of claim 1, wherein the spectrum coded aperture has a combination of an opaque region and a non-congruent region, and
    the non-congruent region is transparent or transmits ultraviolet light, infrared light, or visible light.

13. The system of claim 1, wherein the data processor comprises a preprocessing unit configured to perform the converting the captured image, a disparity estimation unit configured to perform the extracting the disparity, and a conversion unit configured to perform the converting the disparity to the depth information.

14. The system of claim 13, wherein the data processor further comprises an image restoration unit configured to restore the captured image based on the extracted disparity.

15. A method of image capturing and depth extraction, the method comprising:
    recording at least two shifted spectrum channels of a light field to form an image captured from a video;
    converting the captured image into an image of a processing basis;
    estimating a disparity based on a correlation between pixels of the spectrum channels in the processing basis to extract a disparity map;
    restoring the captured image based on the extracted disparity map; and
    converting the disparity map into a depth map.

16. The method of claim 15, wherein the estimating the disparity comprises:
    generating candidate images having respective shifts in the spectrum channels;
    computing a matching cost involved in the candidate images in the spectrum channels;
    propagating a matching cost involved in a low textured region of the candidate images; and
    estimating a matching cost having a sub-pixel accuracy based on the propagated matching cost.

17. The method of claim 15, wherein the correlation between the pixels of the spectrum channel for requesting the disparity estimation includes a correlation metric computed in a sparse moving window.

18. The method of claim 15, wherein the correlation between the pixels of the spectrum channel for requesting the disparity estimation is computed by using at least one stereo matching algorithm.

19. The method of claim 15, wherein the restoring the captured image comprises performing a spectrum channel alignment in the processing basis.

20. A mobile device for image capturing and depth extraction in ultraviolet light, infrared light, or visible light, the mobile device comprising:
- a lens system;
- at least one spectrum coded aperture including at least two regions that pass spectrum channels of an incident light field which are different from each other;
- a sensor configured to record the at least two spectrum channels to form an image captured in a sensor basis; and
- a coded aperture fixture configured to move at least one spectrum coded aperture relatively with respect to the lens system; and
- a data processor configured to convert the image captured in the sensor basis into an image of a processing basis, extract a disparity from the image of the processing basis, and convert the disparity into depth information.

21. The mobile device of claim 20, wherein the different spectrum channels form a basis of the spectrum coded aperture.

22. The mobile device of claim 20, wherein the processing basis is different from the sensor basis and the basis of the spectrum coded aperture.

23. The mobile device of claim 20, wherein the spectrum coded aperture has three regions including a transparent region in a central portion, and two regions having spectrum bandwidths respectively corresponding to yellow and cyan.

24. The mobile device of claim 20, wherein the at least two regions of the spectrum coded aperture have spectrum bandwidths respectively corresponding to yellow and cyan.

25. The mobile device of claim 20, wherein the spectrum coded aperture includes three congruent regions having spectrum bandwidths respectively corresponding to yellow, cyan, and magenta.

26. The mobile device of claim 20, wherein the spectrum coded aperture includes three non-congruent regions having spectrum bandwidths respectively corresponding to yellow, cyan, and magenta.

27. The mobile device of claim 20, wherein the spectrum coded aperture has a smooth bandwidth change over an aperture region.

28. The mobile device of claim 20, wherein the spectrum coded aperture is fixed to the lens system.

29. The mobile device of claim 20, wherein the spectrum coded aperture is attachable to and detachable from the lens system.

30. The mobile device of claim 20, wherein the spectrum coded aperture has a combination of an opaque region and a congruent region, and
- the congruent region is transparent or transmits ultraviolet light, infrared light, or visible light.

31. The mobile device of claim 20, wherein the spectrum coded aperture has a combination of an opaque region and a non-congruent region, and
- the non-congruent region is transparent or transmits ultraviolet light, infrared light, or visible light.

32. The mobile device of claim 20, wherein the data processor comprises a preprocessing unit configured to perform the converting the captured image, a disparity estimation unit configured to perform the extracting the disparity, and a conversion unit configured to perform the converting the disparity to the depth information.

33. The mobile device of claim 32, wherein the data processor further comprises an image restoration unit configured to restore the captured image based on the extracted disparity.

* * * * *